April 12, 1966 G. A. BOWMAN 3,245,400
FOOD WARMER
Filed Oct. 8, 1963 2 Sheets-Sheet 1
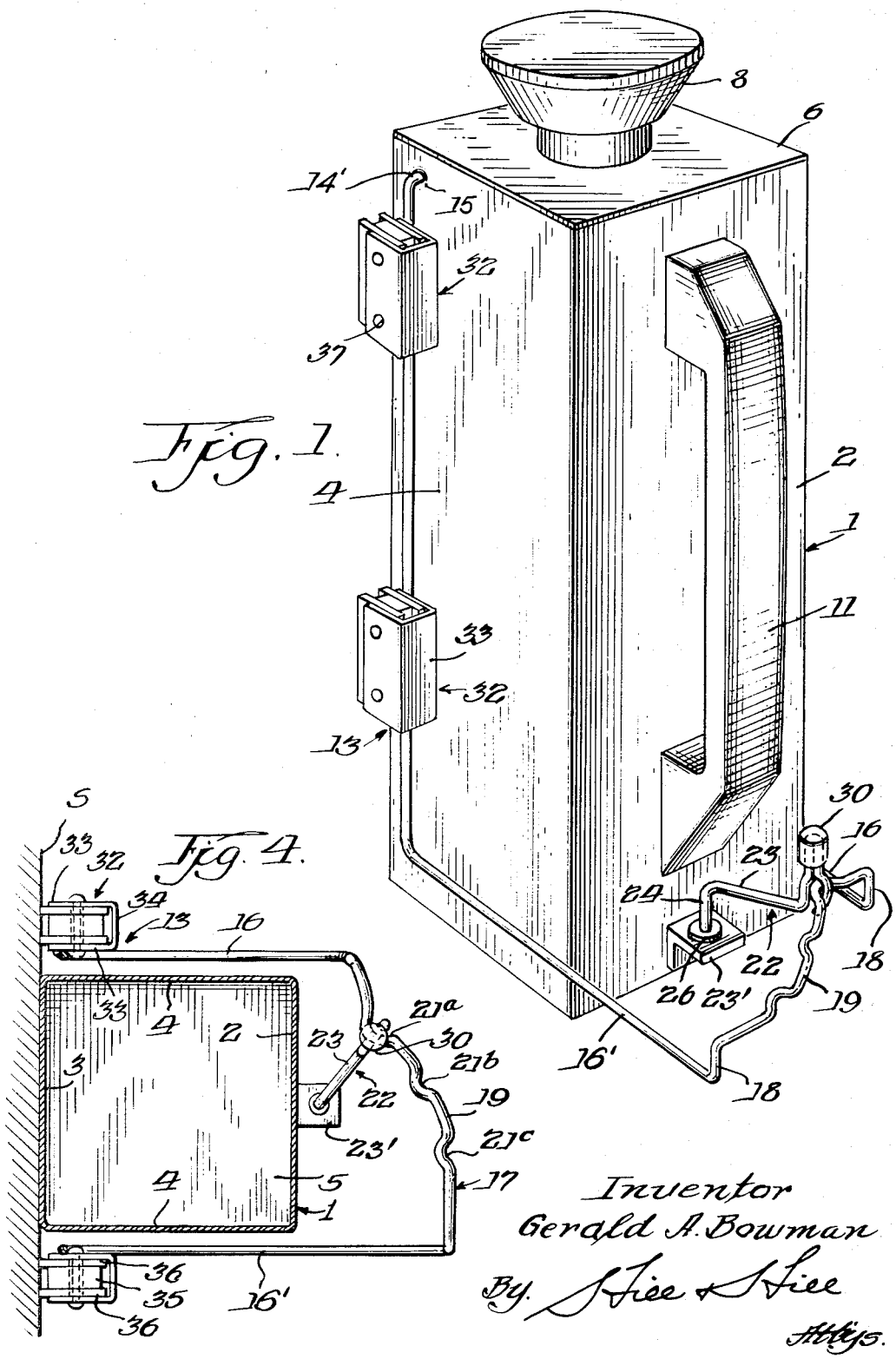
Inventor
Gerald A. Bowman
By Hill & Hill
Attys.

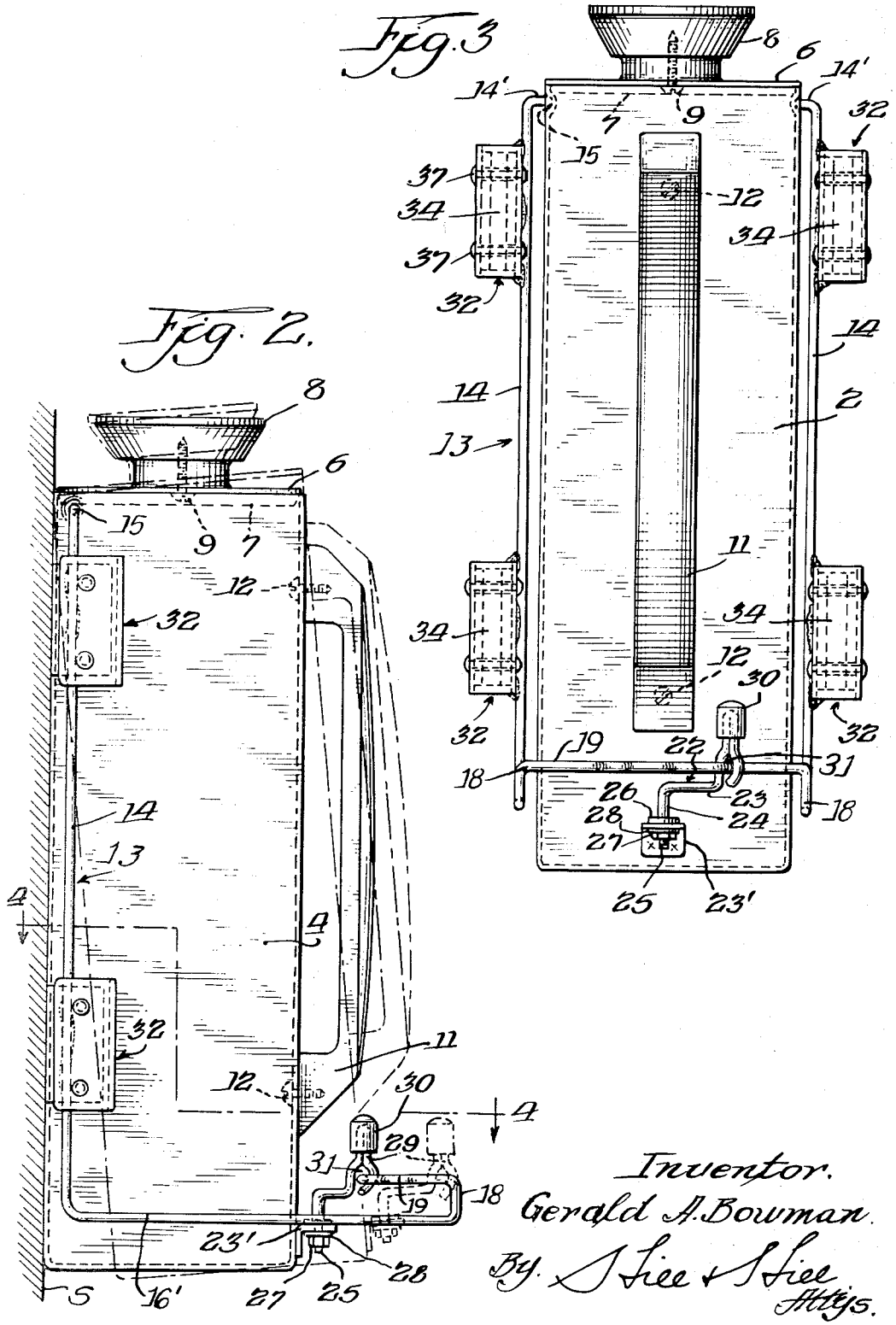

United States Patent Office 3,245,400
Patented Apr. 12, 1966

3,245,400
FOOD WARMER
Gerald Anton Bowman, 1007 Greenwood, Waukegan, Ill.
Filed Oct. 8, 1963, Ser. No. 314,710
6 Claims. (Cl. 126—261)

The invention relates generally to containers for edible products and the like, and more particularly to a warming container.

The invention is directed to a container structure, particularly adapted for use by those in plants and the like whenever a heated or heating surface is available, the invention having among its objects the production of a container device which is provided with means for mounting the same on a heated metal surface, as for example, the side of a boiler, or other heated metallic surface which is capable of providing a source of heat to the container, the latter preferably being so constructed that an adjustment is provided to vary the amount of heat received by the container.

Another object of the invention is the production of such a warming device which may comprise a container and a supporting structure therefor, the latter being provided with magnetic supporting elements by means of which the supporting structure and container associated therewith may be supported from a heated steel wall or the like without the use of special mounting devices or attachments to the heating surface and which device is exceedingly simple in construction, inexpensive to manufacture and very efficient for the purposes intended.

A further object of the invention is the production of such a warming device having a supporting structure and a container which is provided with novel means for effecting adjustment between the supporting structure and the container and thereby vary the relationship of the container with respect to the heating surface to provide an adjustment with respect to the amount of heat received by the container.

Many other objects and advantages of the invention herein shown and described will be obvious to those skilled in the art from the disclosure herein given.

In the drawings, wherein like reference characters indicate like or corresponding parts:

FIG. 1 is a perspective view of a warming container embodying the features of the invention;

FIG. 2 is a side elevational view of the container illustrated in FIG. 1, illustrating in dotted lines another position of adjustment of the container with respect to the supporting structure and heating surface;

FIG. 3 is a front elevational view of the warming container structure; and

FIG. 4 is a transverse sectional view taken approximately on the line 4—4 of FIG. 2.

The present invention contemplates a warmer container which, for example, may be of suitable configuration, preferably having a planar wall adapted to be disposed adjacent a similar heating surface, such as the wall of a boiler or other heat producing device. The container is adapted to be disposed in close proximity to such heat supplying surface, and supported in such relationship by a suitable supporting structure, preferably one that requires no separate attaching means to connect the same to the heating surface, the embodiment illustrated employing a plurality of magnetic elements which are adapted to maintain the supporting structure in operative position on a metal heating surface by the magnetic forces exerted by the magnetic elements.

The container may be movably disposed with respect to its supporting structure to enable the adjustment of the container relative to the heat supply surface, whereby the amount of heat received by the container may be varied, and means may also be provided for retaining the container in any of its adjusted positions with respect to the supporting structure.

Referring to drawings and more particularly to FIG. 1, the reference numeral 1 indicates generally a container for receiving the food or liquid to be warmed and is illustrated as being formed from a suitable material having satisfactory heat conducting characteristics, as for example, aluminum or other metal, the container 1 being of generally rectangular shape having a front wall 2, rear wall 3, side walls 4 and a bottom 5, the upper end being open to permit access to the container and preferably being adapted to be closed by a removable cover member 6, illustrated as having downwardly extending flange portions 7 adapted to be disposed within the container in engagement with the inner surface of the container walls at the open end thereof. To facilitate removal of the cover member 6, particularly when the container and its contents have been heated, the cover may be provided with a knob 8 of plastic or other material having suitable heat insulating qualities. The knob 8 may be suitably secured to the cover, as for example, by means of a screw 9 extending through the cover and threaded into the knob 8. The container 1 likewise may be provided with a suitable handle member 11, which may be formed of material similar to that comprising the knob 8, and which may likewise be mounted to the container by suitable means, as for example, screws 12 extending through the wall 2 of the container and threaded into the handle member.

The supporting structure for the container 1, indicated generally by the numeral 13, is illustrated as being formed from relatively stiff wire stock having two generally vertically extending portions 14, each of which terminates at its upper end in a transversely extending projection 14' adapted to seat in a recess 15 formed in the adjacent side wall 4 of the container structure, thereby interlocking the ends of the supporting structure with the container but permitting pivotal movement of the container relative to the supporting structure on the common axis of the projections 14'. At the opposite ends of each portion 14 are formed transversely extending portions 16' and 16 which extend generally parallel to the planes of their respective side walls 4 and connected at their opposite free ends by an intermediate portion indicated generally by the numeral 17, the latter being illustrated as having downwardly depending portions 18 connected with the associated portions 16' and 16, the intermediate portion 19 extending more or less diagonally with respect to the front wall 2, resulting from the fact that the portion 16' of the supporting structure is of considerably greater length than the portion 16 thereof, and as clearly illustrated in FIG. 4, the intermediate portion 19 is provided with a plurality of notches 21a, 21b and 21c.

Carried by the container 1 at the front wall 2 thereof is an adjusting or control member indicated generally by the numeral 22 which is connected to the container 1 by a generally L-shaped bracket 23, the vertical wall of which is suitably attached to the wall 2, as for example, by welding or bonding operations, the control member 22 being provided with a generally horizontally extending portion 23 having a downwardly divided portion 24 extending from one end thereof, the free end of the portion 24 being pivotally mounted in the bracket 23. The portion 24 of the control member may be suitably connected to the bracket, as for example, by providing the portion with a threaded free end 25 of lesser diameter than the stock forming the control member to form a shoulder adapted to seat on a washer 26 and secured in place by a nut 27 and washer 28. Obviously, the pivotal connection between the member 22 and the bracket 23 may be of any suitable construction and if desired may be formed by suitably upsetting the metal of the member.

The stock forming the control member 22 is suitably bent at its opposite end to provide an upwardly extending portion 29 of double thickness adapted to receive a suitable knob 30 or the like, while the free end of the portion 29 is constructed to form an eye 31 through which the intermediate portion 19 of the supporting structure extends, preventing undesired disconnection therebetween.

Carried by each of the upwardly extending portions 14 of the supporting structure 13 are a pair of magnet assemblies indicated generally by the numeral 32, each assembly comprising a body or housing member 33 illustrated in the embodiment of the invention as being of generally U-shape in transverse cross section, having two generally parallel side wall portions 33 connected by an intermediate portion 34, the respective magnet assemblies being suitably secured to the uprights 14 by any suitable means, as for example, by welding or otherwise securing the body members 33 to the uprights 14. Mounted in each of the body members 33 is a suitable magnet 35 which is disposed between a pair of pole pieces 36, the magnets being so polarized that the faces in contact with the pole pieces form the opposite poles of the magnet structure. The magnets 35 and associated pole pieces 36 may be mounted in the associated housings 33 by any suitable means, as for example, by one or more rivets 37 extending through the walls 33 of the housing and passing through aligned openings in the magnet and associated pole pieces, the openings, if desired, being of a size to permit a slight amount of movement of the magnet assembly.

In use, the filled container 1 may be disposed adjacent a heat supply surface S, illustrated in FIGS. 2 and 4, for example, a planar surface capable of being simultaneously engaged by all four magnet assemblies 32, which exert enough attractive force to efficiently maintain the supporting structure 13, and with it the container 1, in the desired operative position with respect to the surface S. In the position illustrated in FIGS. 2 and 4, the wall 3 of the container will be substantially in engagement with the surface S, permitting maximum transfer of heat from the surface S to the container. The control member 22 in such position is disposed with the eye 31 thereof engaged in the notch 21a. However, if it is desired to reduce the amount of heat transfer between the surface S and the container structure, the control member 22 may be moved to dispose the eye portion 31 thereof in the notch 21b or 21c, thereby pivoting the lower end of the container away from the surface S, as illustrated in broken lines in FIG. 2, which discloses the control member 22 in engagement with the notch 21c to provide a minimum heat transfer between the container and the heating surface.

The invention is of particular application with respect to the warming of foods and liquids for personnel who have a suitable heating surface available which may be utilized as described. Thus, where it is desired to provide a person with a warm lunch, the food to be heated may be transported in the container 1 and when the place of employment is reached the container is attached to the side wall of the heat supplying surface, the container being suitably adjusted through the control member 22 to provide the desired amount of heat, which may be readily determined by the user after a slight period of usage.

It will be appreciated that the specific form of the supporting structure as well as the means for mounting the same on the heating surface may be widely varied and may the specific construction of the control member and cooperable parts associated therewith. For example, if desired, the control member could be formed of any suitable material and the intermediate portion 19 containing the interlocking elements cooperable with the control structure may be suitably formed on an additional member, as for example, a small slotted plate or the like secured to the intermediate portion 19 of the supporting structure.

It will be appreciated from the above disclosure that I have provided a warming container which is very simple in construction, highly efficient for the purposes intended, and capable of relatively inexpensive manufacture.

It will be noted that I have provided a warming container of the type described having novel means for effecting an adjustment of the amount of heat transferred thereto to effect a temperature control of the food within the container.

Having thus described my invention, it will be obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. A container for keeping food products warm, comprising a container body formed from heat-conducting material, having rectangularly shaped side and bottom walls, and an open upper end, a cover member for said open end, manually engageable handle means disposed on the container and cover respectively, a supporting structure for said container, said supporting structure being formed from wire stock, bent to form two upright portions having opposed inwardly directed axially aligned projections at their upper ends, opposite corresponding side walls of said container having respective recesses formed therein at the upper end thereof, disposed adjacent a wall of the container adapted to be disposed in cooperable relation to a metallic heating surface for the transfer of heat from such a surface to such wall, each of said projections being disposed in a respective recess to form a pivotal connection between the container and the supporting structure on the axis of said projections, a plurality of magnet assemblies carried by each of said upright portions, each magnet assembly comprising a pair of spaced pole pieces, a permanent magnet operatively disposed therebetween, a housing for said magnet and pole pieces, and means for maintaining the same in assembled relation, said housing being secured to the associated upright portion with the pole pieces arranged for engagement with such heating surface disposed adjacent said heat receiving wall, said supporting structure having transversely extending portions, each connected to a bottom end of a respective upright portion and connected at their opposite ends by an intermediate portion disposed adjacent another wall of the container, a control member respectively connecting said intermediate portion and the lower end of said container, and cooperable means disposed on said control member and said intermediate portion for operatively retaining the container in any one of a plurality of adjusted positions relative to the supporting structure, as a result of pivotal movement of the container about said axis, to control the amount of heat received therefrom by the container.

2. A warming container as defined in claim 1, wherein said control member is pivotally connected to said container, and said intermediate portion is provided with detent means engageable with said control member, said detent means being disposed at different distances from the pivotal mounting of said control member.

3. A warming container as defined in claim 2, wherein said detent means is formed directly from the stock forming the intermediate portion.

4. A container for keeping food products warm, comprising a container body formed from heat conducting material, having rectangularly shaped side and bottom walls, and an open upper end, a cover member for said open end, manually engageable handle means disposed on the container and cover respectively, a supporting structure for said container, said supporting structure being formed from wire stock, bent to form two upright portions having opposed inwardly directly axially aligned projections at their upper ends, opposite corresponding side walls of said container having respective recess means formed therein at the upper end thereof, disposed adjacent a wall of the container adapted to be disposed in cooperable relation to a metallic heating surface for the transfer of heat from such a surface to such wall, each of said projections being disposed in a respective recess, forming a pivotal connection between the container and the supporting structure on the axis of said projections, a plurality of permanent magnet assemblies, carried by said upright portions, arranged for engagement with such heating surface disposed adjacent said heat receiving wall, the bottom end of each upright portion being connected by an intermediate portion adjacent another wall of the container, and a control member extending between and adjustably connecting the lower portion of said container and said intermediate portion for operatively retaining the container in any one of a plurality of adjusted positions relative to the supporting structure.

5. A container for keeping food products warm, comprising a container body formed from heat conducting material, a supporting structure for said container, said supporting structure being constructed to form two upright portions, means at the upper ends of said upright portions forming a pivotal connection between the container and the supporting structure, a plurality of permanent magnet assemblies carried by each of said upright portions, arranged for supporting engagement with a heating surface disposed adjacent a heat receiving wall of said container, said supporting structure having transversely extending portions, each connected to the bottom end of each upright portion and connected by an intermediate portion disposed adjacent another wall of the container, and a control member adjustably connecting the container and said intermediate portion for operatively retaining the container in any one of a plurality of adjusted positions relative to the supporting structure.

6. A warming container as defined in claim 5, wherein said control member is pivotally connected to said container, and said intermediate portion is provided with detent means engageable with said control member, said detent means being disposed at different distances from the pivotal mounting of said control member.

References Cited by the Examiner
UNITED STATES PATENTS

| | | | |
|---|---|---|---|
| 1,757,448 | 5/1930 | Cooper | 126—19.5 |
| 2,957,596 | 10/1960 | Rehborg | 248—206 X |
| 2,994,319 | 8/1961 | Blume et al. | 126—43 X |

JAMES W. WESTHAVER, *Primary Examiner.*

FREDERICK L. MATTESON, JR., *Examiner.*

CHARLES J. MYHRE, *Assistant Examiner.*